United States Patent
Iwanaga et al.

(10) Patent No.: US 12,486,453 B2
(45) Date of Patent: Dec. 2, 2025

(54) RARE EARTH COMPLEX-CONTAINING COMPOSITION AND FLUORESCENT PENETRANT INSPECTION METHOD USING SAME

(71) Applicant: KABUSHIKI KAISHA TOSHIBA, Tokyo (JP)

(72) Inventors: Hiroki Iwanaga, Kanagawa (JP); Shinji Saito, Kanagawa (JP); Rei Hashimoto, Tokyo (JP); Toshitake Kitagawa, Kanagawa (JP); Kei Kaneko, Kanagawa (JP); Tsutomu Kakuno, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 799 days.

(21) Appl. No.: 17/695,647

(22) Filed: Mar. 15, 2022

(65) Prior Publication Data
US 2022/0363985 A1    Nov. 17, 2022

(30) Foreign Application Priority Data
Apr. 30, 2021   (JP) ................................ 2021-077842

(51) Int. Cl.
C09K 11/06    (2006.01)
C09K 11/02    (2006.01)
G01N 21/91    (2006.01)

(52) U.S. Cl.
CPC ............ C09K 11/06 (2013.01); C09K 11/025 (2013.01); G01N 21/91 (2013.01); C09K 2211/182 (2013.01)

(58) Field of Classification Search
CPC . C09K 11/06; C09K 11/025; C09K 2211/182; G01N 21/91
See application file for complete search history.

(56) References Cited

U.S. PATENT DOCUMENTS

| 7,250,117 B2 | 7/2007 | Iwanaga et al. | |
| 7,575,253 B2 | 8/2009 | Iwanaga | |
| 2004/0265631 A1* | 12/2004 | Iwanaga | H10K 85/351 |
| | | | 252/301.16 |
| 2006/0063036 A1* | 3/2006 | Iwanaga | C09D 11/50 |
| | | | 428/690 |
| 2020/0354389 A1 | 11/2020 | Araki et al. | |

FOREIGN PATENT DOCUMENTS

| JP | H10-332604 A | 12/1998 |
| JP | 2005-015564 A | 1/2005 |
| JP | 2006-077191 A | 3/2006 |
| JP | 2006-196777 A | 7/2006 |
| JP | 2006-213666 A | 8/2006 |
| JP | 3811142 B2 | 8/2006 |
| JP | 2008-034201 * | 2/2008 |
| JP | 2008-115225 A | 5/2008 |
| JP | 2008-159604 A | 7/2008 |
| JP | 2014-024767 A | 2/2014 |
| JP | 2019-094332 A | 6/2019 |

OTHER PUBLICATIONS

H. Iwanaga, "Investigation of strong photoluminescence and highly soluble Eu(III) complexes with phosphine oxides and beta-diketones", Journal of Luminescence, 200, (2018), 233-239, Mar. 24, 2018.*
Iwanaga et al., "Development of ultraviolet LED devices containing europium (III) complexes in fluorescnet layer", Journal of Alloys and Compounds, 408-412, (2006), 921-925, Jul. 4, 2005.*
Iwanaga et al., "Study of Molecular Structures and Propeties of Europium(III) Complexes with Phopshine Oxides by NMR Analysis", Japanese Journal of Applied Physics, vol. 44, No. 6A, 2005, pp. 3702-3705, Jun. 10, 2005.*
JP Notice of Allowance for Japanese Patent Application No. 2021-077842 mail date Oct. 15, 2024 (3 pages).
Iwanaga, H., Investigation of strong photoluminescence and highly soluble Eu(III) complexes with phosphine oxides and ß-diketonates, Journal of Luminescence, 2018, 200, 233-239 (7 pages).
H., Iwanaga, "Development of Novel Rare-Earth Complexes and Their Application to Emission Devices," Journal of Photopolymer Science and Technology, 2008, vol. 21, No. 2 (pp. 165-172).
H., Iwanaga, "Solubility in Fluorinated Medium and Thermal Properties of Europium(III) Complexes with Phosphine Oxides," Japanese Journal of Applied Physics, 2006, vol. 45, No. 1B (pp. 558-562).
Japanese Office Action for JP Appl. Ser. No. 2024-157333 issued on May 30, 2025 (pp. 1-5).
Iwanaga et al., "Novel Tb(III) complexes with two different structures of phosphine oxides and their properties," Journal of Luminescence, vol. 130, Issue 5, May 2010, pp. 812-816.
JP Officce Action for Application No. 2024-157333 mailing date Oct. 21, 2025, 11 pages with English translation.

\* cited by examiner

Primary Examiner — C Melissa Koslow
(74) Attorney, Agent, or Firm — Foley & Lardner LLP

(57) ABSTRACT

The present embodiment provides a composition containing a rare earth complex and a fluorine-based solvent, which can also be used in a fluorescent flaw inspection method. A rare earth complex-containing composition according to the present embodiment is a rare earth complex-containing composition that contains a rare earth complex containing: a rare earth ion; two or more phosphine oxide ligands having different structures; and a β-diketone ligand, the rare earth complex being dissolved in a fluorine-based solvent. The present embodiment also relates to a fluorescent flaw inspection method using the same.

11 Claims, 1 Drawing Sheet

US 12,486,453 B2

RARE EARTH COMPLEX-CONTAINING COMPOSITION AND FLUORESCENT PENETRANT INSPECTION METHOD USING SAME

CROSS REFERENCE TO RELATED APPLICATIONS

This application is based upon and claims the benefit of priority from the prior Japanese Patent Application No. 2021-077842, filed on Apr. 30, 2021, the entire contents of which are incorporated herein by reference.

FIELD

The present embodiment relates to a rare earth complex-containing composition and a fluorescent penetrant inspection method using the same.

BACKGROUND

The penetrant inspection is an inspection method of detecting a crack or a defect of an infrastructure facility or the like, which cannot be visually confirmed, using a fluorescent substance. More specifically, the method is a method in which a solution in which a luminescent material is dissolved in a solvent is applied, as an inspection agent, to a target for inspection, an excessive inspection agent is removed, then the luminescent material that has penetrated a damaged portion or the like is made to emit light by irradiation with an ultraviolet lamp, thereby searching for the damaged portion or the like. Currently, the mainstream solvents of probing agents are alkanes such as kerosene, and the alkanes have a property of dissolving luminescent materials well, but are dangerous substances, and thus costly in storage and handling. For this reason, it has been studied to replace the solvents of the probing agents with safer solvents. For example, studies have been made to replace kerosene with an environmentally friendly and safe fluorine-based solvent.

On the other hand, the luminescent material used in a flaw inspection agent preferably has a high emission intensity. For this reason, various luminescent materials have been studied, and, among them, a rare earth complex in which a phosphine oxide or a β-diketone is coordinated to a rare earth is preferably employed.

However, such a rare earth complex has high solubility in highly polar alcohols and the like, but has extremely low solubility in fluorine-based solvents. Specifically, it is difficult to dissolve the rare earth complex at a concentration exceeding 0.01 wt %, and, as a result, a sufficient emission intensity as a flaw inspection agent cannot be realized, leading to difficulty in putting the rare earth complex into practical use.

DETAILED DESCRIPTION

Figure 1:
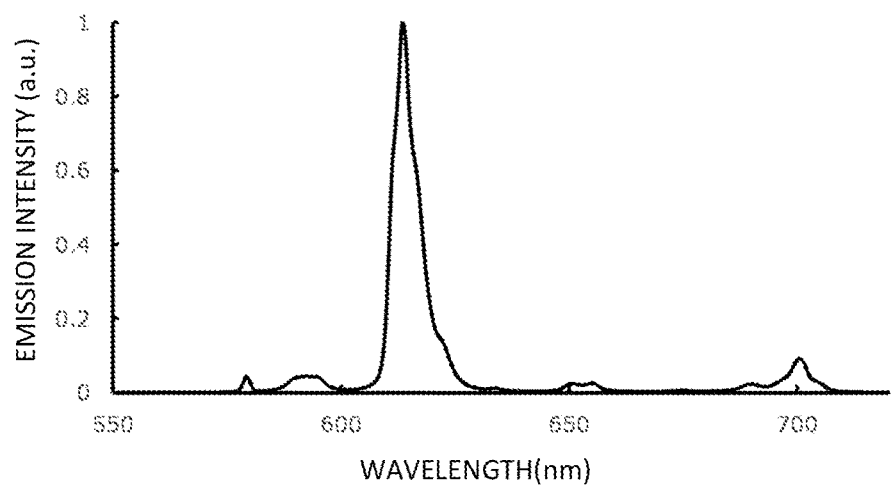
FIG. 1 is an emission spectrum of a rare earth complex-containing composition according to an embodiment.

A rare earth complex-containing composition according to the present embodiment is a rare earth complex-containing composition that contains a rare earth complex containing:

a rare earth ion;
two or more phosphine oxide ligands having different structures; and
a β-diketone ligand,
the rare earth complex being dissolved in a fluorine-based solvent.

A penetrant inspection method according to an embodiment includes:

applying the rare earth complex-containing composition to a surface of a subject;
removing an excessive rare earth complex-containing composition on the surface; and
irradiating the surface with ultraviolet rays to observe fluorescence,
thereby inspecting presence or absence and a position of damage on the subject surface.

Embodiments will now be explained with reference to the accompanying drawings.

<Rare Earth Complex-Containing Composition>

The rare earth complex-containing composition (hereinafter, sometimes referred to simply as a composition) according to the present embodiment contains a specific luminescent material and a specific solvent.

The present inventors' study has revealed that a rare earth complex-containing composition having a high concentration and a high emission intensity can be obtained by using a specific rare earth complex as a luminescent material and a specific fluorine-based solvent. Such a composition is very useful as a fluorescent flaw inspection agent because of its high emission intensity. The specific rare earth complex used in such a composition contains:

a rare earth ion;
two or more phosphine oxide ligands having different structures; and
a β-diketone ligand.

The rare earth ion is preferably selected from the group consisting of Eu (III), Tb (III), and mixtures thereof, and is more preferably Eu (III). Eu (III) absorbs ultraviolet light and emits red light.

By combining various ligands with such a rare earth complex to form complexes, luminous efficiency can be increased, and various complexes are known. As the ligand, a β-diketone ligand and a phosphine oxide ligand are known, but the rare earth complex according to the embodiment is characterized by containing a combination of a phosphine oxide ligand and a β-diketone ligand, and further by containing two or more phosphine oxides having different structures.

Generally, the rare earth complex according to the embodiment contains two phosphine oxide ligands and three β-diketone ligands. However, the rare earth complex must contain two phosphine oxide ligands having different structures and one β-diketone ligand, and the other ligands can be arbitrarily selected as long as the effects according to the embodiment are not impaired. For example, three or more phosphine oxides may be contained, or another ligand such as a halogen ion may be contained.

In the rare earth complex used in the embodiment, it is preferable that, among two or more phosphine oxide ligands, at least one phosphine oxide ligand should contain an aromatic group and at least one different phosphine oxide ligand should contain no aromatic group. The rare earth complex containing such a ligand has high solubility in a fluorine-based solvent which will be described later, and also provides high solution stability.

A general phosphine oxide ligand has a structure in which three substituents are bonded to a phosphorus atom. In the embodiment, the ligand containing an aromatic group preferably has three aromatic groups. On the other hand, the ligand not containing an aromatic group preferably has three aliphatic groups. Here, the aromatic groups and the aliphatic groups may have a substituent, or adjacent ligands may be bonded to each other.

More specifically, the rare earth complex according to the embodiment is preferably represented by the following general formula (1):

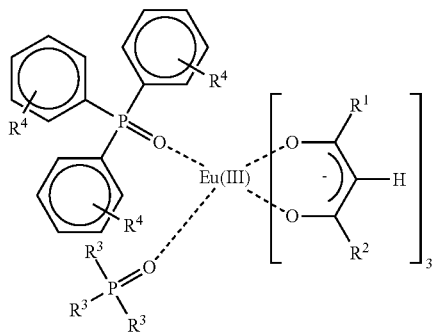
(I)

wherein:
R$^1$ and R$^2$ are each independently a linear or branched alkyl group, a linear or branched alkoxy group, a linear or branched perfluoroalkyl group, a substituted or unsubstituted phenyl group, or a substituted or unsubstituted naphthyl group, preferably a linear or branched C$_1$-C$_6$ alkyl group, a linear or branched C$_1$-C$_6$ alkoxy group, or a linear or branched C$_1$-C$_6$ perfluoroalkyl group, R$^3$'s are each independently a linear or branched alkyl group, a linear or branched alkoxy group, or a linear or branched perfluoroalkyl group, preferably hydrogen, a linear or branched C$_1$-C$_6$ alkyl group, or a linear or branched C$_1$-C$_6$ alkoxy group, and R$^4$'s are each independently hydrogen, a linear or branched alkyl group, a linear or branched alkoxy group, a linear or branched perfluoroalkyl group, or halogen, preferably hydrogen, a linear or branched C$_1$-C$_6$ alkyl group, a linear or branched C$_1$-C$_6$ alkoxy group, a linear or branched C$_1$-C$_6$ perfluoroalkyl group, or halogen.

In general formula (I), it is preferable that two substituents R$^1$ and R$^2$ contained in the β-diketone ligand should be different from each other. Since two substituents R$^1$ and R$^2$ are different from each other, the emission intensity of the rare earth complex tends to increase, and the rare earth complex is more useful when used as an inspection agent. At least one of R$^1$ and R$^2$ is preferably a linear or branched perfluoroalkyl group. When the substituent contains fluorine, the emission intensity of the rare earth complex tends to increase, and the solubility in a fluorine-based solvent which will be described later tends to be improved. However, even when both R$^1$ and R$^2$ are perfluoroalkyl groups, there is little improvement in solubility when they are the same groups. More specifically, R$^1$ and R$^2$ are preferably a combination of an unsubstituted C$_1$-C$_5$ alkyl group and a C$_1$-C$_5$ perfluoroalkyl group.

In general formula (I), the phosphine oxide ligand containing no aromatic group contains three non-aromatic groups. The non-aromatic group is selected from the group consisting of hydrogen, a linear or branched alkyl group, a linear or branched alkoxy group, and a linear or branched perfluoroalkyl group. Among these, the non-aromatic group is preferably hydrogen, a linear or branched alkyl group, a linear or branched alkoxy group.

In general formula (I), the phosphine oxide ligand containing an aromatic group contains three aromatic groups. These aromatic groups are substituted or unsubstituted phenyl groups. The substituted phenyl groups have a substituent consisting of a linear or branched alkyl group, a linear or branched alkoxy group, a linear or branched perfluoroalkyl group, or halogen. A bonding position of these substituents is not particularly limited, but a rare earth complex containing a phosphine oxide ligand having a phenyl group having a substituent at an ortho position tends to have a high emission intensity, which is preferable.

Among such rare earth complexes represented by general formula (1), the following rare earth complexes can be indicated as preferable ones.

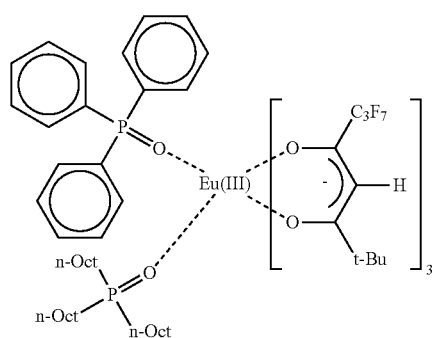
(I-1)

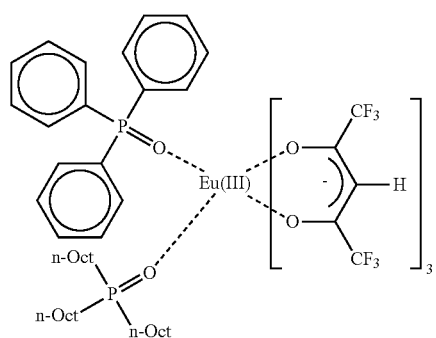
(I-2)

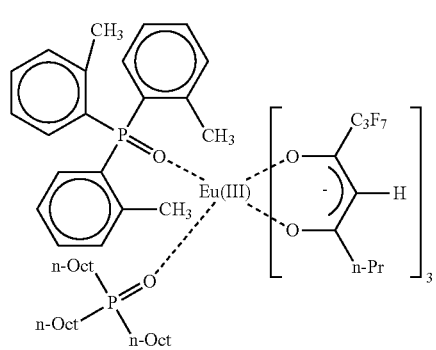
(I-3)

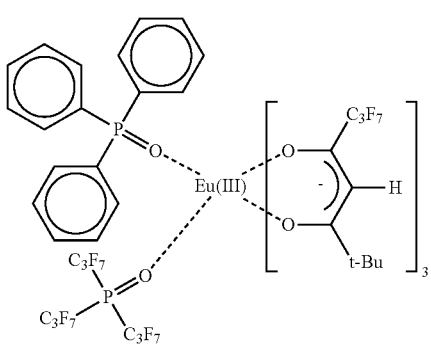

(I-4)

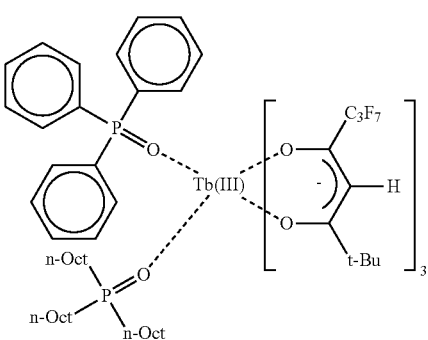

(I-8)

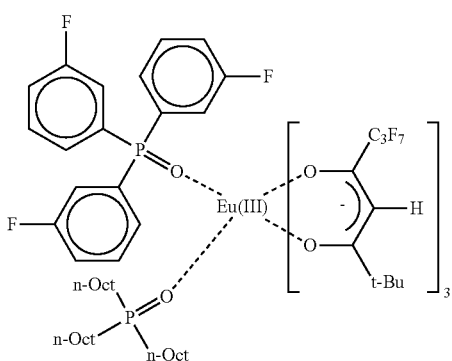

(I-5)

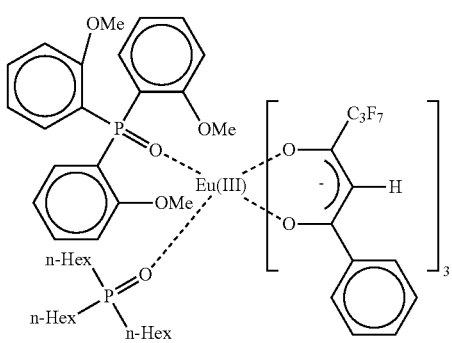

(I-6)

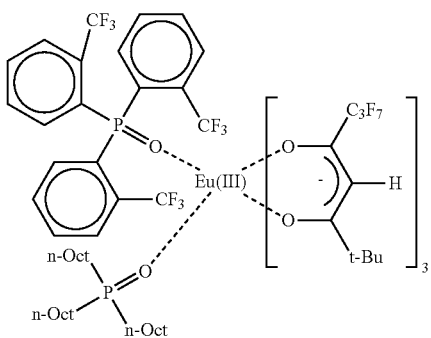

(I-7)

The composition according to the embodiment contains a fluorine-based solvent capable of dissolving the above-described rare earth complex at a high concentration. Such a solvent is an aliphatic hydrocarbon or aliphatic ether in which some or all of the hydrogen atoms are fluorine-substituted. More specifically, the fluorine-based solvent is selected from the group consisting of hydrofluorocarbon, perfluoroalkane, hydrofluoroether, hydrofluoroolefin, or a mixture thereof. As such a fluorine-based solvent, various fluorine-based solvents are commercially available, and specific examples thereof include Fluorinert FC-72 and Fluorinert FC-770 (both are product names, perfluoroalkane, manufactured by 3M Japan Ltd.); Performance Fluid PF-5052 (product name, manufactured by 3M Japan Ltd.); Novec 7100, Novec 7200, and Novec 7300 (all are trade names, hydrofluoroether, manufactured by 3M Japan Ltd.); and Vertrel XF, and Vertrel XE (both are trade names, hydrofluorocarbon, manufactured by Chemours-Mitsui Fluoroproducts Co., Ltd.). These solvents can be arbitrarily selected and used according to the purpose.

These fluorine-based solvents are environmentally friendly materials, and compositions containing the solvents are excellent in handleability. Furthermore, compositions containing these fluorine-based solvents are preferable because they have appropriate viscosity and surface tension, and are excellent in penetration into cracks and the like when used as inspection agents.

The composition in the embodiment contains a rare earth complex, and particularly preferably contains a high-concentration rare earth complex. Conventionally, it has not been known that a rare earth complex can be dissolved in a fluorine-based solvent at a sufficient concentration, and therefore a rare earth complex/fluorine-based solvent-containing composition capable of providing a sufficient emission intensity has not been known. Specifically, conventionally, a rare earth complex/fluorine-based solvent-containing composition containing a rare earth complex at a concentration of 0.01 wt % or more has not been known. On the other hand, the composition in the embodiment can contain a rare earth complex in an amount of 0.1 wt % or more based on the total mass of the composition. The rare earth complex according to the embodiment contains a rare earth complex at a concentration of preferably 0.5 mass % or more, more preferably 1.0 mass % or more, still more preferably 2.0 mass % or more.

On the other hand, an upper limit of the concentration of the rare earth complex is not particularly limited, and a high concentration of about 90 mass % can be realized by selecting the types of the rare earth complex and the fluorine-based solvent. However, from the viewpoint of the stability over time, viscosity, penetration, cost, and the like of the composition, the concentration of the rare earth complex is generally 20 mass % or less, preferably 10 mass % or less.

The composition according to the embodiment can contain any additive, if necessary. Specific examples of the additive include an auxiliary solvent, a stabilizer, and a colorant. However, when this composition is used as an inspection agent, other additives are generally unnecessary.

<Fluorescent Flaw Inspection Method>

A fluorescent flaw inspection method according to the embodiment can be performed in the same manner as a conventionally known method except that the above-described composition is used as an inspection agent. A specific penetrant inspection method includes:

applying the rare earth complex-containing composition to a surface of a subject;

removing an excessive rare earth complex-containing composition on the surface; and irradiating the surface with ultraviolet rays to observe fluorescence, thereby inspecting presence or absence and a position of damage on the subject surface.

The fluorescent flaw inspection method is well known as a non-destructive inspection method, and, for example, a standard is defined also in JIS Z2343 and the like. The subject is arbitrary. Specifically, the method is applicable to metallic materials and non-metallic materials except for hygroscopic or porous materials such as wood. In particular, the method is also applicable to large-sized facilities such as power generation facilities, plant facilities, and buildings.

In the inspection, pretreatment can also be performed on the subject. The surface of the subject can be cleaned with a cleaning liquid or the like to improve the wettability of the surface, or, if there is a crack or the like, the inside thereof can be hollowed to improve the penetration of the inspection agent.

A method of applying the composition to the surface of the subject is arbitrary, and spray coating, brush coating, or the like is generally used. An amount of the composition to be applied may be any amount as long as the amount is so sufficient that the composition can penetrate into a crack or the like.

A method of removing an excessive rare earth complex-containing composition on the surface of the subject is also arbitrary, and a squeezer or a fibrous material is generally used.

By irradiation of the subject surface with ultraviolet rays after removal of the excessive rare earth complex-containing composition, the rare earth complex contained in the composition that has penetrated damage such as a crack, if present on the surface, emits light, so that the damage can be found. A wavelength of the ultraviolet rays can be selected according to the type of the rare earth complex contained in the composition. For example, the complex represented by formula (I-1) has a strong absorption band around a wavelength of 350 nm, and thus it is preferable to irradiate the subject surface with ultraviolet rays having that wavelength. At this time, strong light emission in the vicinity of 610 nm can be measured.

Observation may be performed visually, or may be performed using a monitor device capable of detecting light emission.

In the fluorescent flaw inspection method according to the embodiment, the inspection agent to be used is environmentally friendly. In addition, the safety of the inspection agent is high, and the handleability is also excellent. Since the light emission of the composition can be made sufficiently high, the damage can be easily and accurately detected.

Examples 101 and 102 and Comparative Examples 101 and 102

A rare earth complex represented by formula (I-1), (I-2), (R-1), or (R-2) was blended in Novec 7200 (trade name, hydrofluoroether) so as to attain a concentration of 0.01 mass %, 0.1 mass %, 0.2 mass %, or 1.0 mass %, and sufficiently stirred at room temperature to visually evaluate the dissolved state.

A: Easily dissolved
B: Dissolved
C: Not dissolved

TABLE 1

|  | | Example | | Comparative Example | |
|---|---|---|---|---|---|
|  |  | 101 | 102 | 101 | 102 |
| rare earth complex | | I-1 | I-2 | R-1 | R-2 |
| Concentration | 0.01 mass % | A | A | C | C |
|  | 0.1 mass % | A | B | C | C |
|  | 0.2 mass % | A | C | C | C |
|  | 1.0 mass % | A | C | C | C |

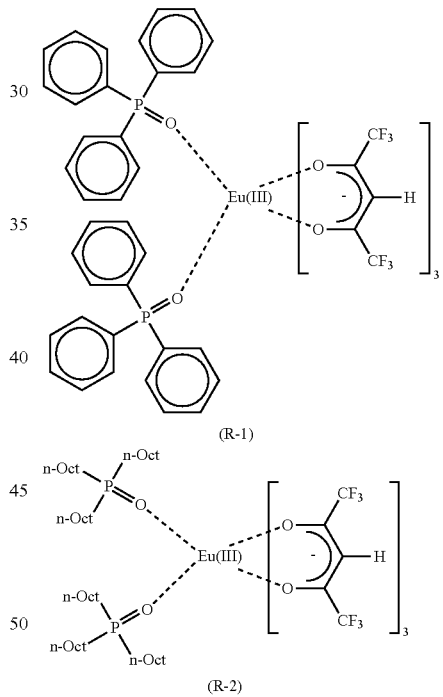

(R-1)

(R-2)

Examples 201 and 202 and Reference Example 201

The rare earth complex of formula (I-1) was dissolved in Fluorinert FC-72 at a concentration of 0.12 mass % (Example 201) or 0.24 mass % (Example 202) to obtain a composition. The obtained composition was uniformly dissolved, and there was no precipitate or the like even after storage over time.

An emission spectrum of the composition according to Example 201 was as shown in FIG. 1.

Figure 2:
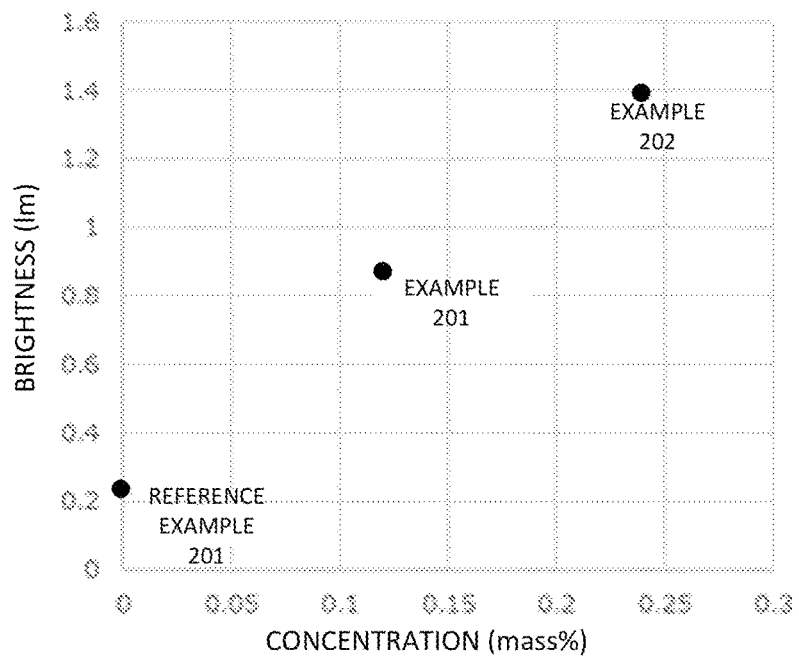
FIG. 2 is a diagram showing the relationship between a concentration and emission intensity of the rare earth complex-containing composition according to the embodiment.

In addition, fluorescence intensities of these compositions were measured. As Reference Example 201, a solvent alone containing no rare earth complex was used. The obtained results were as shown in FIG. 2.

Under these measurement conditions, it could be confirmed that the composition according to the embodiment can achieve an emission intensity of 0.8 lm or more. When the rare earth complex-containing composition is used in the fluorescent flaw inspection method and a damage position is visually confirmed, an emission intensity of 0.8 lm or more is generally required, and thus it could be confirmed that the composition according to the embodiment can provide a sufficient emission intensity.

Note that the rare earth complexes represented by formulae (R-1) and (R-2) were added, as the rare earth complexes, to Fluorinert FC-72 (trade name) so as to attain a concentration of 0.12 mass %, and sufficiently stirred, but could not be completely dissolved. For this reason, these compositions could not be confirmed to provide a sufficient emission intensity.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. A rare earth complex-containing composition comprising a rare earth complex comprising:
    a rare earth ion;
    two or more phosphine oxide ligands having different structures; and
    a β-diketone ligand,
    the rare earth complex being dissolved in a fluorine-based solvent,
    wherein the fluorine-based solvent is hydrofluoroether.

2. The rare earth complex-containing composition according to claim 1, wherein the rare earth ion is Eu (III).

3. The rare earth complex-containing composition according to claim 1, wherein at least one of the phosphine oxide ligands comprises an aromatic group, and at least one of the phosphine oxide ligands does not comprise an aromatic group.

4. The rare earth complex-containing composition according to claim 1,
    wherein the rare earth complex is represented by the following general formula (1):

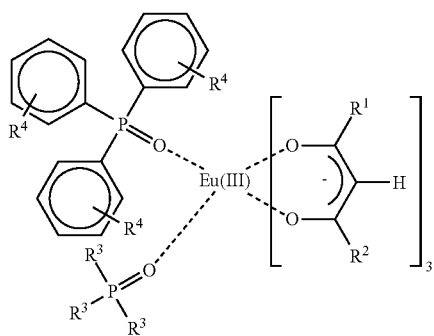

(I)

wherein:
    $R^1$ and $R^2$ are each independently a linear or branched alkyl group, a linear or branched alkoxy group, a linear or branched perfluoroalkyl group, a substituted or unsubstituted phenyl group, or a substituted or unsubstituted naphthyl group,
    $R^3$'s are each independently hydrogen, a linear or branched alkyl group, a linear or branched alkoxy group, or a linear or branched perfluoroalkyl group, and
    $R^4$'s are each independently hydrogen, a linear or branched alkyl group, a linear or branched alkoxy group, a linear or branched perfluoroalkyl group, or halogen.

5. The rare earth complex-containing composition according to claim 4, wherein the $R^1$ and $R^2$ are different from each other.

6. The rare earth complex-containing composition according to claim 4, wherein at least one of the $R^1$ and $R^2$ is a linear or branched perfluoroalkyl group.

7. The rare earth complex-containing composition according to claim 4, wherein the $R^4$ is bonded to an ortho position of a phenyl group.

8. The rare earth complex-containing composition according to claim 1, wherein a content of the rare earth complex is 0.1 mass % or more based on the total mass of the rare earth complex-containing composition.

9. The rare earth complex-containing composition according to claim 1, wherein a content of the rare earth complex is 1 mass % or more based on the total mass of the rare earth complex-containing composition.

10. The rare earth complex-containing composition according to claim 1, which is used in a fluorescent penetrant inspection agent.

11. A penetrant inspection method comprising:
    applying a rare earth complex-containing composition to a surface of a subject;
    removing an excessive rare earth complex-containing composition on the surface; and
    irradiating the surface with ultraviolet rays to observe fluorescence,
    thereby inspecting presence or absence and a position of damage on the subject surface,
    wherein the rare earth complex-containing composition comprises a rare earth complex, comprising:
    a rare earth ion;
    two or more phosphine oxide ligands having different structures; and
    a β-diketone ligand,
    the rare earth complex being dissolved in a fluorine-based solvent.

* * * * *